United States Patent [19]
Matsui et al.

[11] Patent Number: 5,825,141
[45] Date of Patent: Oct. 20, 1998

[54] MOTOR CONTROL APPARATUS

[75] Inventors: Hideo Matsui; Michiaki Kuroiwa; Taiki Nishiuchi, all of Tokyo, Japan

[73] Assignees: Mitsubishi Electric Engineering Co., Ltd.; Mitsubishi Denki Kabushiki Kaisha, both of Tokyo, Japan

[21] Appl. No.: 568

[22] Filed: Dec. 30, 1997

[30] Foreign Application Priority Data

May 22, 1997 [JP] Japan .................................. 9-132628

[51] Int. Cl.$^6$ ............................... H02P 6/00; G06F 1/00
[52] U.S. Cl. ..................... 318/254; 388/907.5; 388/921
[58] Field of Search .................................. 318/254, 722, 318/723; 388/907.5, 921

[56] References Cited

U.S. PATENT DOCUMENTS

| | | |
|---|---|---|
| 4,346,434 | 8/1982 | Morinaga . |
| 4,488,103 | 12/1984 | Morinaga et al. . |
| 5,287,045 | 2/1994 | Uehara .................................... 318/268 |

FOREIGN PATENT DOCUMENTS

| | | |
|---|---|---|
| 2-7897 | 1/1990 | Japan . |
| 3-70475 | 3/1991 | Japan . |
| 5-328734 | 12/1993 | Japan . |

*Primary Examiner*—Bentsu Ro
*Attorney, Agent, or Firm*—Burns, Doane, Swecker & Mathis, LLP

[57] ABSTRACT

A motor control apparatus which comprises: a central processing unit which executes general control of processing of the motor control apparatus, a timer portion which generates predetermined pulses from a reference clock signal, a plurality of registers provided corresponding to control signals of respective phases in which data can be reloaded by the central processing unit, shift registers which are able to store the data having the same number of bits as the number of the registers and the values of plurality of registers can be reloaded to the shift registers by the predetermined pulses output from the timer portion, and a control signal generator means which generates control signals of respective phases of a polyphase motor.

3 Claims, 7 Drawing Sheets

MOTOR CONTROL APPARATUS

BACKGROUND OF THE INVENTION

1. Field of the Invention

The present invention relates to a motor control apparatus to be used for the control of a motor such as a 3-phase inverter motor.

2. Description of the Prior Art

Figure 6:
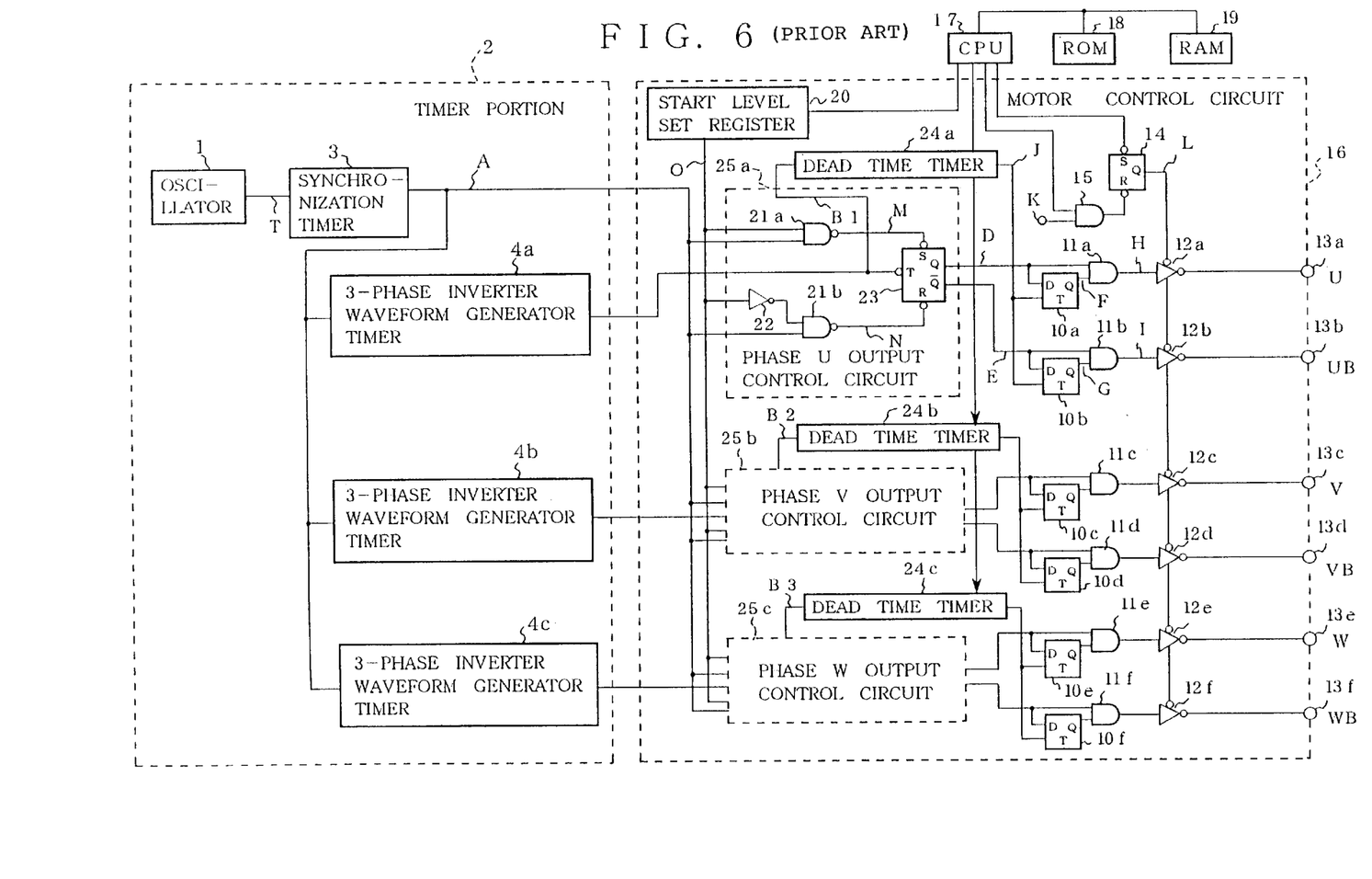
FIG. 6 shows the constitution of a microcomputer having a built-in motor controller of a conventional type.

FIG. 6 shows a circuit diagram showing the constitution of a microcomputer having a built-in motor controller of a conventional type which is described on a Japanese Patent, Laid-Open No. Hei 3-70475. In FIG. 6, a reference numeral 1 denotes an oscillator, 2 denotes a timer portion, 16 denotes a motor control circuit, 17 denotes a CPU which executes general control of the whole activities, 19 denotes a RAM which stores data temporarily and functions as a memory for a work area, etc., and 18 denotes a ROM in which a control program, etc. are stored beforehand.

The timer portion 2 comprises a timer 3 for synchronization which outputs a rising pulse A at the occurrence of an overflow making an output signal T of the oscillator 1 as a count source, and 3-phase inverter waveform generator timers, 4a to 4c, which output pulses, B1 to B3, based on the pulse A. The 3-phase inverter waveform generator timers, 4a to 4c, are operated in a one-shot mode.

In the next step, the constitution of the motor control circuit 16 will be explained. A reference numeral 20 denotes a start level setting register which outputs a signal O which decides the start level of a 3-phase output under the control of the CPU 17, 25a denotes an output control circuit of phase U which decides the output levels of motor control signals U and UB of 1 phase out of 3 phases. The output control circuit of phase U 25a is composed of: a NAND circuit 21a which NANDs the signal O and the pulse A and outputs a signal M, an inverter 22 which inputs the signal O and inverts it, a NAND circuit 21b which NANDs the output of the inverter 22 and the pulse A and outputs a signal N, and a flip-flop circuit 23 which outputs signals, D and E, in making the signal M a set signal, the signal N a reset signal and the pulse B1 a trigger signal.

Reference numerals, 25b and 25c, denote output control circuits of phases, V and W, and they have the same constitutions as that of the output control circuit 25a of phase U. Reference numerals, 24a, 24b and 24c, denote dead time timers which set a period of time in which both motor control signals, U and UB, do not take a low level simultaneously (hereinafter referred to as a short circuit prevention time) and they are operated based on the output signals, B1, B2 and B3, of 3-phase inverter waveform generator timers, 4a, 4b and 4c, respectively, and each of them outputs a falling pulse J. Reference numerals, 10a and 10b, denote flip-flop circuits which input the signal J as trigger pulses and input the output signals, D and E, of the output control circuit of phase U as data, 11a denotes an AND circuit which ANDs the signal D and an output F of the flip-flop 10a and outputs a signal H, and 11b denotes an AND circuit which ANDs the signal E and an output G of the flip-flop circuit 10b and outputs a signal I.

The flip-flop circuits, 10a and 10b, and the AND circuits, 11a and 11b, constitute a short-circuit prevention control circuit of phase U. In the same way, concerning phase V and phase W, the flip-flop circuits, 10c and 10d, and AND circuits, 11c and 11d, constitute a short-circuit prevention control circuit of phase V, and the flip-flop circuits, 10e and 10f, and the AND circuits, 11e and 11f, constitute a short-circuit prevention control circuit of phase W. Reference numerals, 12a to 12f, denote tristate output buffers which output motor control signals, U and UB, V and VB, and, W and WB, and ON-OFF control of the outputs is executed by an output signal L of the flip-flop circuit 14. The flip-flop circuit 14 inputs a control signal of the CPU 17 as a set signal and inputs the output of the AND circuit 14 as a reset signal, the AND circuit 14 which inputs a control signal from the CPU 17 and a signal K from an external circuit. Reference numerals, 13a to 13f, denote output terminals of motor control signals, U and UB, V and VB, and, W and WB.

In FIG. 6, there are 3 phases, U, V and W, but their operations are the same, so that the operation concerning phase U only will be explained.

Figure 7:
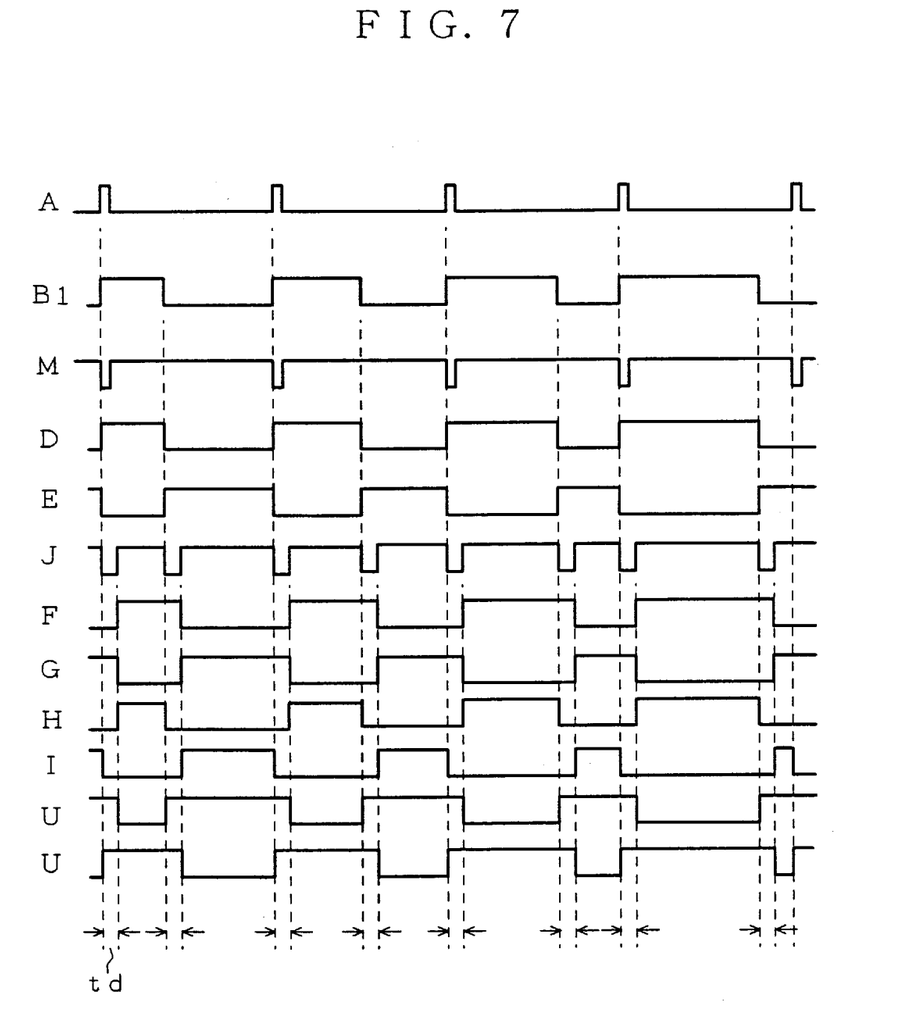
FIG. 7 shows a timing chart of a motor control circuit of a conventional type.

FIG. 7 shows a timing chart of a conventional motor control circuit. The frequency of a clock signal T from the oscillator 1 is divided by the synchronization timer 3 and when an overflow occurs the synchronization timer 3 outputs a pulse A. The 3-phase inverter waveform generator timer 4a is made to output a pulse B1, a PWM output waveform, by the pulse A.

The level of a signal O, output from a start level set register 20, is set by the CPU 17, and a NAND circuit 21a outputs a signal M in inputting the signal O and the pulse signal A, and also a signal N is output from an inverter 22 and a NAND circuit 21b. FIG. 7 shows a timing chart when the signal O is at a high level, and in this case, the signal M is made to be at a low level synchronizing with the pulse A; thereby, the output D of a flip-flop 23 is set to be at a high level and the output E of the same is set to be at a low level. In the next step, by the fall of the pulse B1 the output of the flip-flop circuit 23 is reversed and the signal D is changed to be at a low level and the signal E is changed to be at a high level.

A short-circuit prevention time td of a dead time timer 24a is set by the CPU 17, and a PWM waveform J is output in synchronizing with the rise and fall of the signal B1. Signals, F and G, having a phase difference of td from the signals, D and E, are formed by the signal J and the flip-flop circuits, 10a and 10b. A signal H is obtained by ANDing the signals, D and F, in the AND circuit 11a. A signal I is obtained by ANDing the signals, E and G, in the AND circuit 11b. The signals, H and I, are output from output terminals, 13a and 13b, through output buffers, 12a and 12b; thereby, the motor drive waveforms U and UB can be obtained. In the same way as the U and UB waveforms which are explained in the above, the motor drive waveforms, V and VB, or W and WB are obtained. The flip-flop circuit 14 which outputs a signal L for controlling the output of output buffers, 12a to 12f, can be set or reset by the CPU 17 and also it can be reset by the external signal K; thereby it is made possible to execute ON-OFF controls of motor control signals, U and UB, V and VB, and, W and WB, by the CPU 17 or the external signal K.

Since a motor control apparatus of a conventional type is constituted as mentioned in the above, it has been possible to obtain only a waveform of a reversed level of the control signals, U and UB. Further, when an external event occurs (interruption, for example), it has been impossible to change the period of 3-phase output, or the output level of control signals, U and UB. Accordingly, the kinds of motors which can be controlled have been limited.

SUMMARY OF THE INVENTION

The present invention was invented to solve the problems as mentioned in the above. The object of the present invention is to obtain a motor control apparatus which is able to control various kinds of motors in a wide range.

It is made possible in a motor control apparatus according to the present invention to reload data by a central processing unit. The motor control apparatus comprises: a plurality of registers provided corresponding to control signals in respective phases, shift registers which are able to store the data having the same number of bits as the number of the plurality of registers and values of the plurality of registers can be reloaded to the shift registers by a predetermined pulse output from the timer portion, and a control signal generator means which generates control signals for respective phases of a polyphase motor based on the output signals of the shift registers. Therefore, complicated control signals can be generated by changing write data of the registers; thereby, there is an effect that the control of various kinds of motors is made possible.

The timer portion in a motor control apparatus according to the present invention comprises: a synchronization timer which generates synchronizing pulses, a waveform generator timer which starts counting every time when a pulse is output from the synchronization timer and after the predetermined counting is finished it changes the output signal level, which makes a shift register operate, and a first OR circuit which ORs a synchronizing pulse output from the synchronization timer and a count value write signal of the synchronization timer, and supplies the ORed signal to the waveform generator timer and also supplies it to the shift registers as a start signal for reloading the data stored in the registers to the shift registers. Therefore, the period of a motor control signal can be varied by the count value write signal of the synchronization timer, so that there is an effect that more diverse kinds of control signals can be generated.

The motor control apparatus according to the present invention further comprises a second OR circuit which ORs the output of the first OR circuit and the reload instruction signal output from the central processing unit, and supplies the ORed data to the shift registers as a start signal for reloading the data stored in the registers to the shift registers. Therefore, it is made possible to reload data to the shift registers independent of the period of motor control signals, so that there is an effect that more diverse kinds of control signals can be generated.

DETAILED DESCRIPTION OF THE PREFERRED EMBODIMENTS

In the following, embodiments according to the present invention will be explained in detail referring to the drawings.

Embodiment 1

Figure 1:
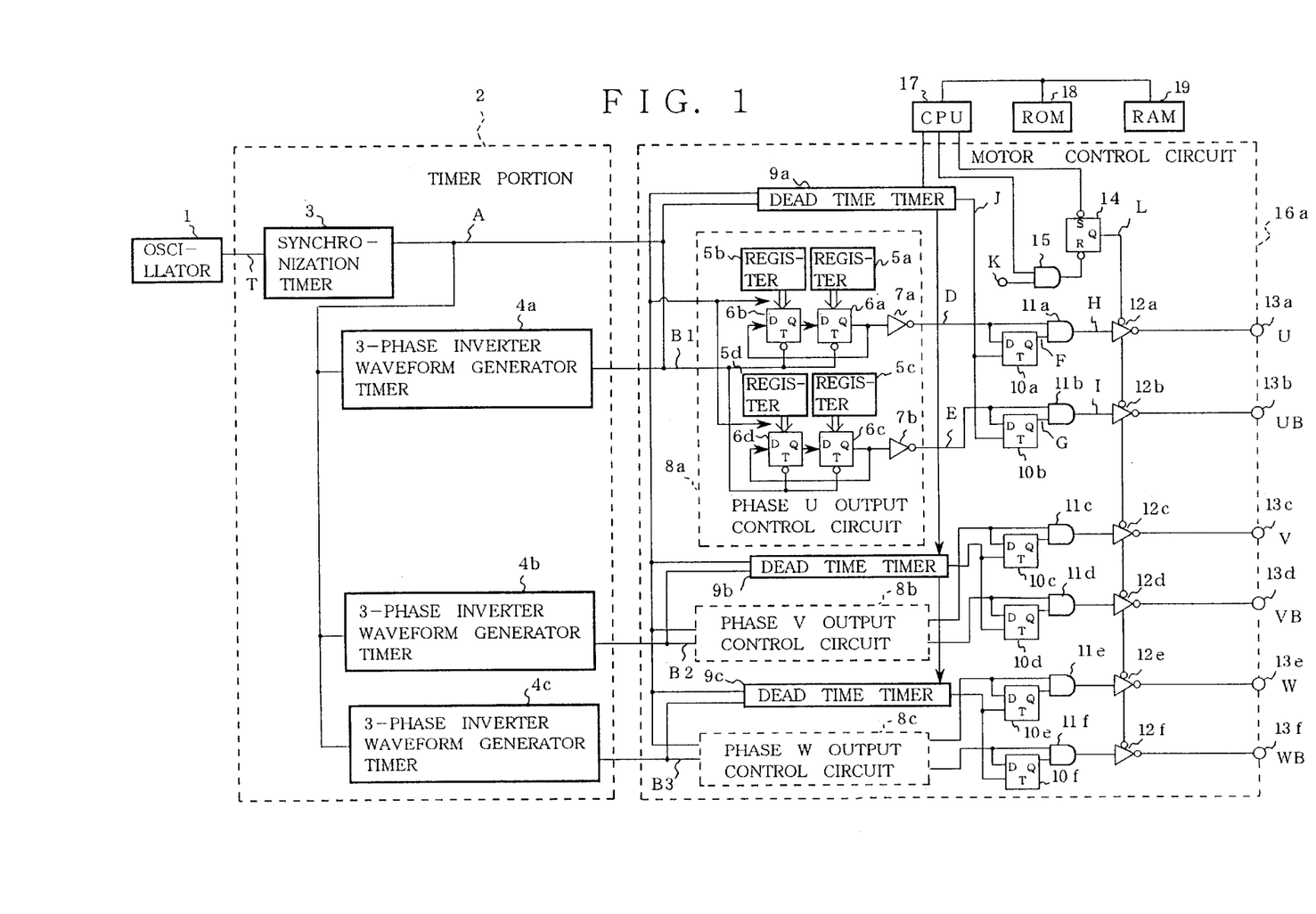
FIG. 1 shows a circuit diagram showing the constitution of a motor control apparatus in an embodiment 1 according to the present invention.

FIG. 1 shows a circuit diagram showing the constitution of a motor control apparatus in the embodiment 1 according to the present invention. In FIG. 1, a reference numeral 1 denotes an oscillator, 2 denotes a timer portion, 16a shows a motor control circuit, 17 denotes a CPU (central processing unit) which control the over all operation, 19 denotes a RAM which stores data temporarily and also functions as a memory for a work area, etc., and 18 denotes a ROM in which a control program, etc. are stored beforehand. The oscillator 1, timer portion 2, CPU 17, ROM 18, RAM 19 are the same as those shown in FIG. 6, so that duplicated explanation will be omitted. The control of respective portions executed by the CPU 17 are different from that in conventional ones as explained in the following.

In the next step, the constitution of the motor control circuit 16a will be explained. A reference numeral 8a denotes an output control circuit of phase U and it is composed of: registers, 5a, 5b, 5c and 5d, whose values are set by the control of the CPU 17, shift registers, 6a and 6b, to which the data stored in the registers, 5a and 5b, and set by the pulse signal A are shifted by the fall of the output B1 of the 3-phase inverter waveform generator timer 4a, an inverter 7a which outputs a signal D in reversing the output of the shift register 6a, shift registers, 6c and 6d, to which the data stored in the registers, 5c and 5d, and set by the pulse signal A are shifted by the fall of the output B1 of the 3-phase inverter waveform generator timer 4a, and an inverter 7b which outputs a signal E in reversing the output of the shift register 6c.

Reference numerals, 8b and 8c, denote output control circuits of phases V and W, and they have the same constitution as that of 8a, so that duplicated explanation will be omitted. The 3-phase inverter waveform generator timers, 4b and 4c, are the same as the 3-phase inverter waveform generator timer 4a, so that duplicated explanation will be omitted. The following are the same as conventional ones shown in FIG. 6, so that duplicated explanation will be omitted: reference numerals, 9a, 9b and 9c, denote dead time timers which set short-circuit prevention periods and they are operated by the rise of the pulse A and the fall of the pulse B1 and output a signal J. The short-circuit prevention control circuit of phase U (control signal generator means) 8a being composed of flip-flop circuits, 10a and 10b, (control signal generator means) and AND circuits, 11a and 11b, (control signal generator means), the short-circuit prevention control circuit of phase V 8b being composed of flip-flop circuits, 10c and 10d, (control signal generator means) and AND circuits, 11c and 11d, (control signal generator means), the short-circuit prevention control circuit of phase W (control signal generator means), 8c being composed of flip-flop circuits, 10e and 10f, (control signal generator means) and AND circuits, 11e and 11f, (control signal generator means), output buffers, 12a to 12f, (control signal generator means), output terminals, 13a to 13f, a flip-flop circuit 14 (control signal generator means), and AND circuit 15 (control signal generator means) are the same as those shown in FIG. 6, so that duplicated explanation will be omitted.

Figure 2:
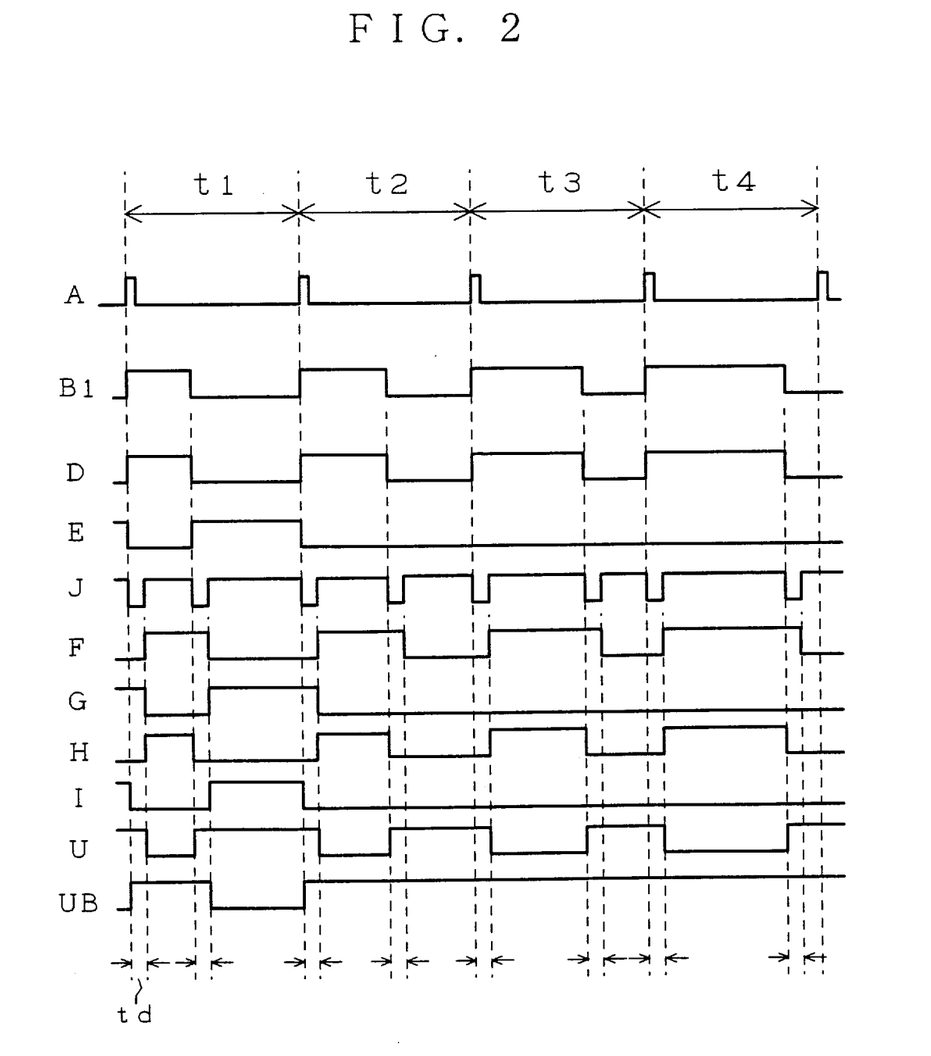
FIG. 2 shows a timing chart which shows the timing of signals in respective portions of a motor control apparatus in the embodiment 1 according to the present invention.

FIG. 2 shows a timing chart showing the timing of signals in respective portions of a motor control apparatus in the embodiment 1 according to the present invention. In FIG. 1, phase U, phase V and phase W are shown but their operations are the same, so that explanation will be made concerning only phase U.

The frequency of the clock pulse T from the oscillator 1 is divided in the synchronization timer 3 and in the case of an overflow, the synchronization timer 3 outputs a pulse A. The pulse B1, a PWM output waveform, is output from the 3-phase inverter waveform generator timer 4a controlled by the pulse A. It is assumed that registers, 5a and 5b, are set to be "0" and "1", and registers, 5c and 5d, are set to be "1" and "0" respectively by the CPU 17. In FIG. 1, though the connections are omitted, it is arranged that the data of registers, 5a to 5d, can be set by the control of the CPU 17.

The values of the registers, 5a and 5b, are reloaded to the shift registers, 6a and 6b by the rise of the pulse A, and the signal D is set to be at a high level through the inverter 7a. In the same way, the values of the registers, 5c and 5d, are reloaded to the shift registers, 6c and 6d, and the signal E is set to be at a high level through the inverter 7b. In the next step, the values of shift registers, 6a and 6b, and shift registers, 6c and 6d, are shifted by the fall of the pulse B1, and the signal D is changed to be at a low level and the signal E is changed to be at a high level.

In parallel to the above-mentioned operations, after the fall of the pulse A, in the section t1, the values of the registers, 5c and 5d, are rewritten to "1" and "1". Then, in the section t2, the values of registers, 5c and 5d, are reloaded to the shift registers, 6c and 6d, by the rise of the pulse A. Since the values of registers, 5c and 5d, have been rewritten to "1" and "1" in the section t1, the signal E is changed to a low level, and when the values of shift registers, 6c and 6d, are shifted by the fall of the pulse B1, it is also made to be at a low level. The signal D takes the same waveform as that in the section t1. In the sections, t3 and t4, the same operations are performed as those in the section t2, and the waveforms of signals, D and E, are as shown in FIG. 2.

The short-circuit prevention time td is set in the dead time timer 9a by the CPU 17, and the timer 9a is operated at the rise of the pulse A and the fall of the pulse B1, and outputs a PWM waveform J. Signals, F and G, which have phase difference of td from the signals, D and E, are generated with the signal J and the flip-flop circuits, 10a and 10b. The signals, D and F, are ANDed in the AND circuit 11a to obtain a signal H. The signals, E and G, are ANDed in the AND circuit 11b to obtain a signal I. The signals, H and I, are output from output terminals, 13a and 13b, through output buffers 12a and 12b, and the motor control signals, U and UB are obtained. In the section t1, the waveforms of motor control signals, U and UB, obtained in the embodiment 1 have opposite polarities to each other in the same way as in the case of a conventional motor control circuit, and in sections, t2 to t4, a PWM waveform having a varying signal level is obtained as the control signal U, and a signal having a fixed high level is obtained as a control signal UB.

As mentioned in the above, in the embodiment 1, motor drive waveforms having opposite phases to each other are obtained in the same way as in the case of conventional ones, and also the output levels of signals, U and UB, can be set independent of each other, furthermore, a short-circuit prevention time can be prepared which is an essential arrangement for the protection of external power apparatuses against the breakage caused by the motor control signals; therefore, there is an effect in the motor control apparatus in the embodiment 1 that it is able to deal with a variety of kinds of motors in a wider range than before. Embodiment 2

Figure 3:
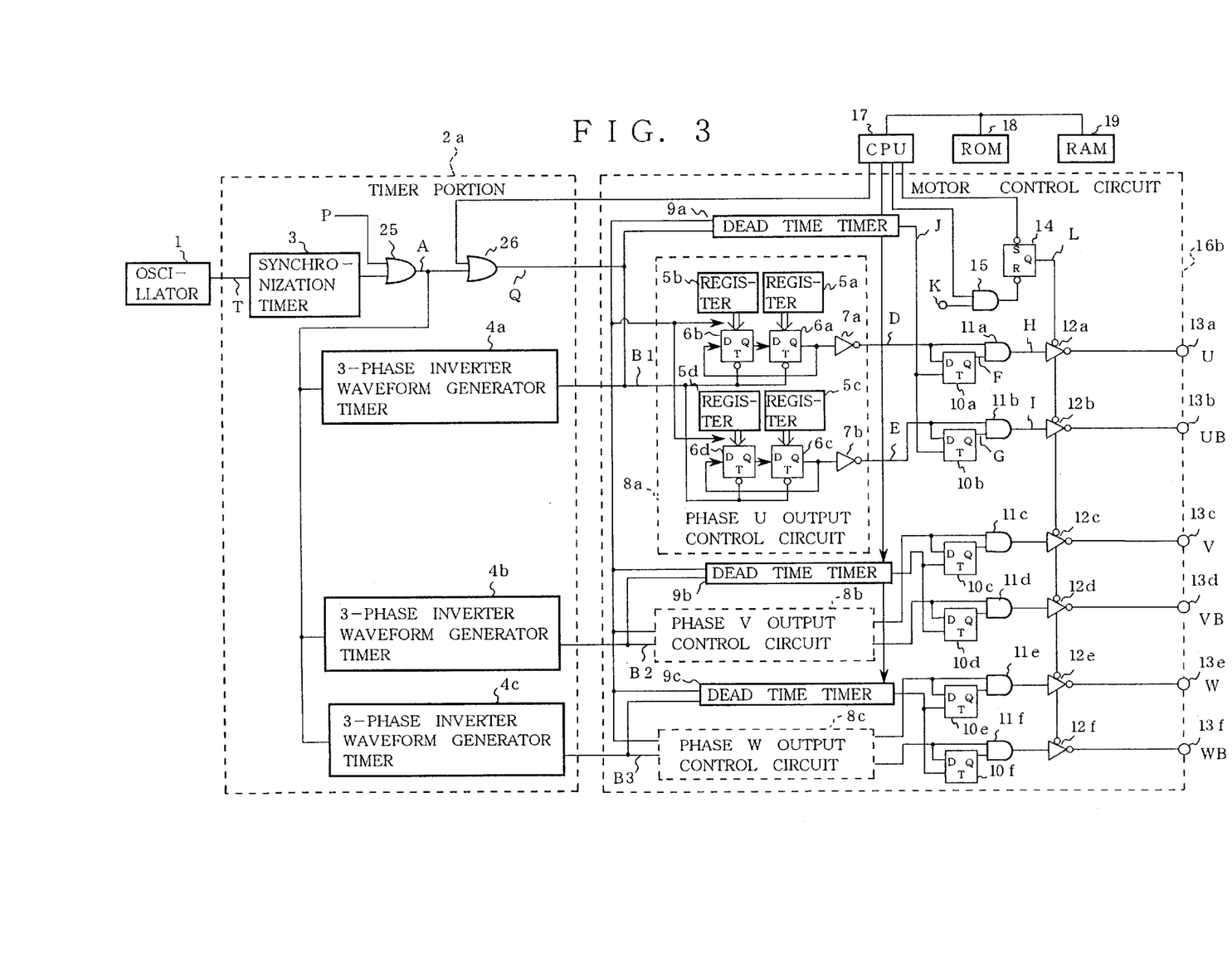
FIG. 3 shows a circuit diagram showing the constitution of a motor control apparatus in a second embodiment according to the present invention.

FIG. 3 shows a circuit diagram showing the constitution of a motor control apparatus in a second embodiment according to the present invention. The motor control apparatus is composed of: a CPU 17, a ROM 18, a RAM 19, an oscillator 1, a timer portion 2a, and a motor control circuit 16b. In FIG. 3, parts or portions which are the same as those of the prior art shown in FIG. 6 or those in the embodiment 1 shown in FIG. 1 are denoted by the same reference numerals and duplicated explanation will be omitted.

The clock pulse T is a count source in the timer portion 2a, and the timer portion 2a comprises: a synchronization timer 3 which outputs a rising pulse at the occurrence of an overflow, an OR circuit (first OR circuit) 25 which inputs the output of the synchronization timer 3 and a write signal for writing the value of the synchronization timer 3 and outputs a pulse A, an OR circuit (second OR circuit) 26 which inputs the pulse A and a trigger signal from the CPU 17 and outputs a pulse Q, and 3-phase inverter waveform generator timers, 4a to 4c, which output pulses, B1 to B3, based on the pulse A. The 3-phase inverter waveform generator timer 4a is operated by a one-shot mode.

In the next step, a motor control circuit 16b will be explained. A reference numeral 8a denotes an output control circuit of phase U and comprises: registers, 5a and 5b, whose values are set by the control of a CPU 17, shift registers, 6a and 6b. to which data in the resisters, 5a and 5b, set by a pulse Q are shifted by the fall of the output B1 of the 3-phase inverter waveform generator timer 4a, an inverter 7a which outputs a signal D in reversing the output of the shift register 6a, shift registers, 6c and 6d, to which data in the registers, 5c and 5d, set by pulse signal Q are shifted by the fall of the output B1 of the 3-phase inverter waveform generator timer 4a, and an inverter 7b which outputs a signal E in reversing the output of the shift register 6c.

Reference numerals, 8b and 8c, denote output control circuits of phases V and W respectively, and they have the same constitution as that of the 8a. Reference numerals, 9a, 9b and 9c, denote dead time timers, and they are operated by the rise of the pulse Q and the fall of the pulse B1, and output a signal J. The short-circuit prevention control circuit of phase U 8a constituted with flip-flop circuits, 10a and 10b, and AND circuits, 11a and 11b, the short-circuit prevention control circuit of phase V 8b constituted with flip-flop circuits, 10c and 10d, and AND circuits, 11c and 11d, the short-circuit prevention control circuit of phase W 8c constituted with flip-flop circuits, 10e and 10f, and AND circuits, 11e and 11f, output buffers, 12a to 12f, output terminals, 13a to 13f, a flip-flop circuit 14, and AND circuit 15 are the same as conventional ones or those in the first embodiment, so that explanation of them will be omitted.

Figure 4:
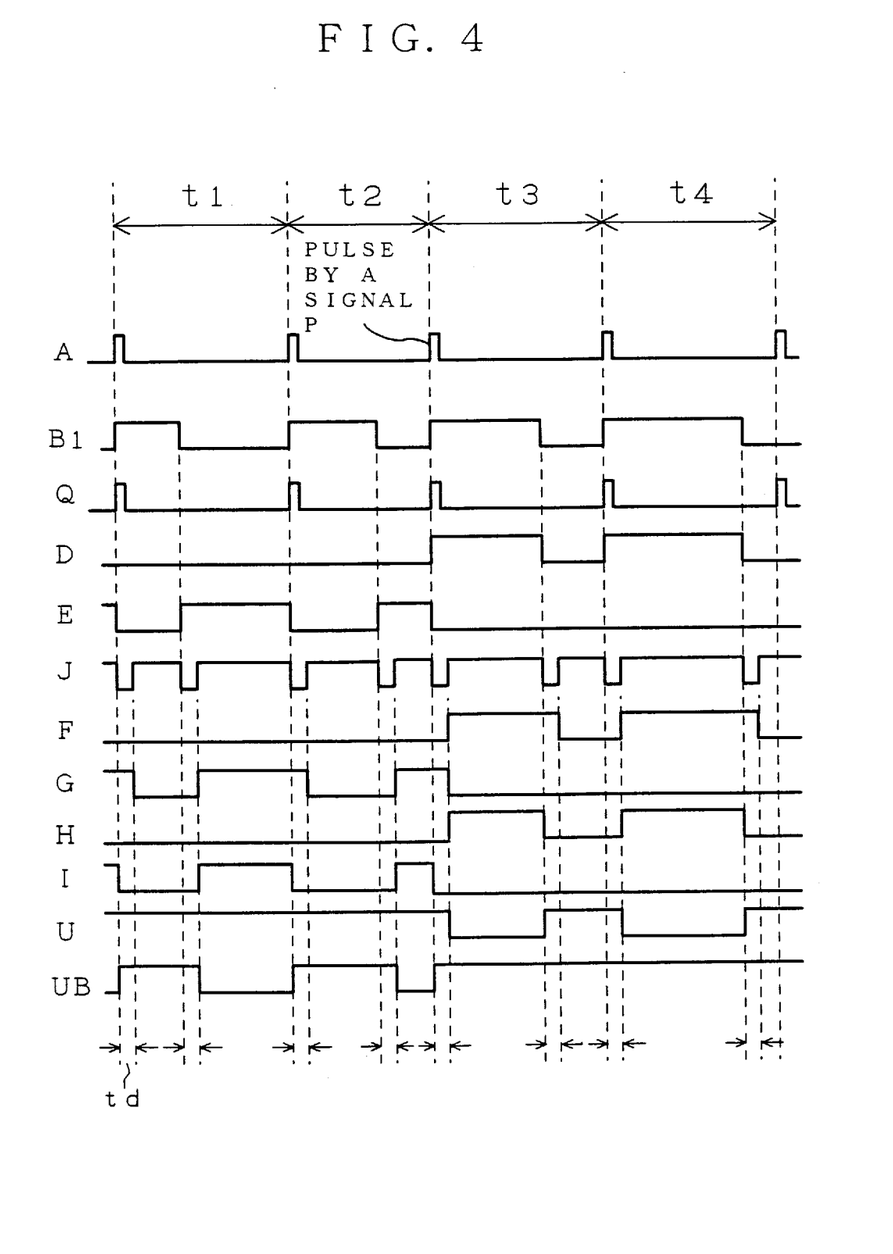
FIG. 4 shows a timing chart which shows the timing of signals when the periods of signals are varied in a motor control apparatus in the second embodiment according to the present invention.

FIG. 4 shows a timing chart showing the timing of signals when the periods of the signals are varied in a motor control apparatus in the embodiment 2 according to the present invention. In FIG. 4, in a section t1, data, "1" and "1", are set in the registers, 5a and 5b, and data, "1" and "0", are set in the registers, 5c and 5d, by the CPU 17, and signals, D and E, are generated as shown in FIG. 4 in the same operations as explained in the embodiment 1. In the case where an external event such as an interruption occurs in a section t2, the operation of the synchronization timer 3 is stopped by the CPU 17 and data, "0" and "1", are set in the registers, 5a and 5b, and data, "1" and "1", are set in the registers, 5c and 5d.

Next, when the next section t3 is set in the synchronization timer 3, a signal P is made to rise, and the values previously set in the registers, 5a and 5b, are set in the resisters, 6a and 6b, and the values previously set in the registers, 5c and 5d, are set in the registers, 6c and 6d. Then, the signal D is changed to a high level, and the signal E is changed to a low level, and also the output pulse B1 of the 3-phase inverter waveform generator timer 4a is made to rise. After that, the operation of the synchronization timer 3 is started by the control of the CPU 17. In the section t3, shifting actions are performed in the shift registers, 6a, 6b, 6c and 6d, with the fall of the pulse B1 in the same way as the actions in the embodiment 1, and both signal D and signal E are made to be at a low level. In the section t4 the actions performed in the section t3 are repeated and the signal D and the signal E are made to be as shown in FIG. 4.

The dead time timer 9a is made to operate at the rise of the signal Q and the fall of the pulse B1 and outputs a signal J. As explained in the above, the signals, D, E and J, are output from the output terminals, 13a and 13b, through the flip-flop circuits, 10a and 10b, AND circuits, 11a and 11b, and output buffers, 12a and 12b, as motor control signals, U and UB.

Figure 5:
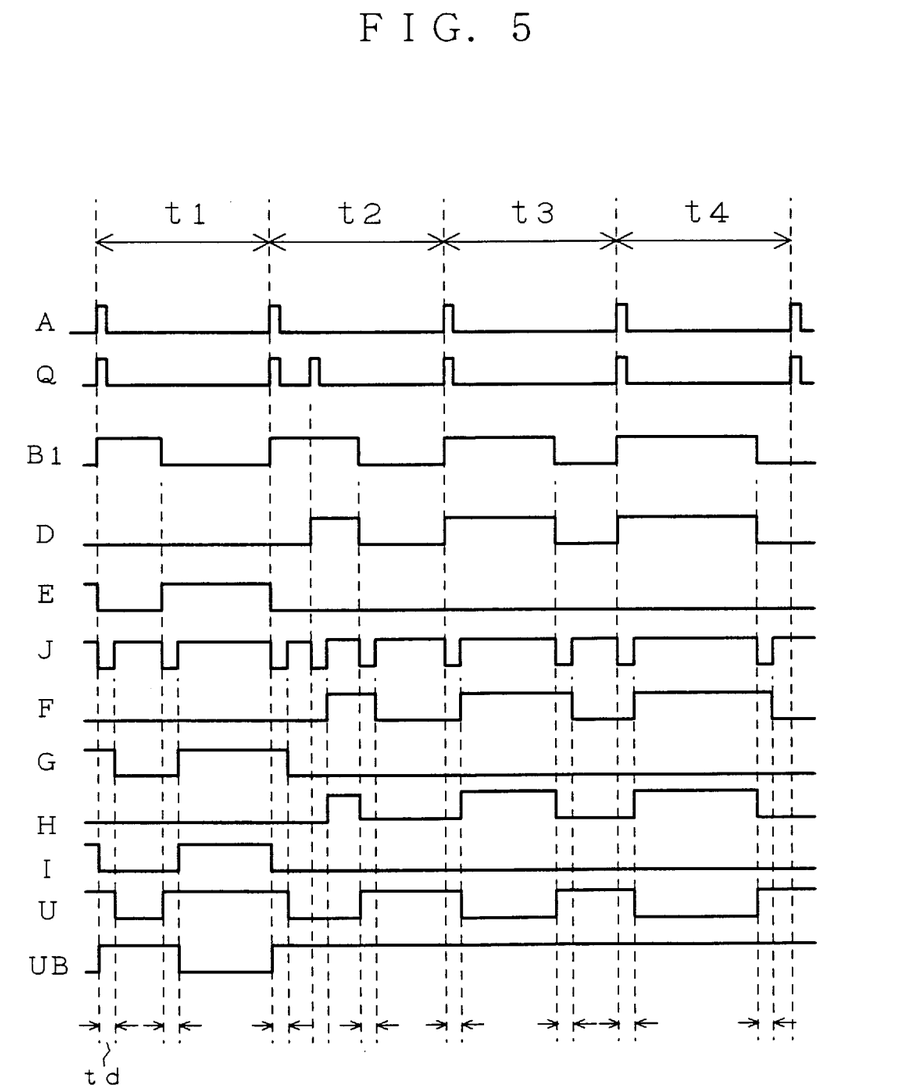
FIG. 5 shows a timing chart which shows the timing of signals in respective portions in a case where diverse control signals are generated in transferring data to the shift registers by the control of a CPU in a motor control apparatus in the embodiment 2 according to the present invention.

Next, the variation of motor control signals being controlled by the CPU 17 will be explained. FIG. 5 shows a timing chart showing the timing of signals in respective portions of a motor control apparatus in the embodiment 2 according to the present invention. In the figure, the actions in t1 is the same as those shown in FIG. 4, so that duplicated explanation will be omitted. When an external event occurs in the section t2, the CPU 17 sets data, "0" and "1", in the registers, 5a and 5b, and "1" and "1", in the registers, 5c and 5d, and after that, a rising trigger pulse is output to the OR circuit 26 from the CPU 17. When the rising trigger pulse is supplied to the OR circuit 26 from the CPU 17, the signal Q is made to rise, and the values which are previously set in the registers, 5a and 5b, are set in the registers, 6a and 6b, and the values in the registers, 5c and 5d, are set in the registers, 6c and 6d. In the result, the signal D is made to be at a high level, and the signal E is made to be at a low level.

After that in synchronizing with the fall of the trigger B1 shifting actions are performed in shift registers, 6a, 6b, 6c and 6d, then the level of the signal D is changed from a high level to a low level and the level of the signal E is kept being low. In sections, t3 and t4, periodic actions are performed in the same way as in the case shown in FIG. 4, and the signal D and signal E are made to be the waveforms as shown in FIG. 5. The dead time timer 9a is operated at the rise of the signal Q and the fall of the pulse B1, and outputs a signal J. The above-mentioned signals, D, E and J, are output from output terminals, 13a and 13b, through the flip-flop circuits, 10a and 10b, AND circuits, 11a and 11b, and output buffers, 12a and 12b, as motor control signals, U and UB.

The waveforms shown in FIG. 4 shows the case where both period and output level of the motor control signal output are varied, and FIG. 5 shows the case where only the output level of the motor control signal is varied keeping the period constant.

As described in the above, in the case of the motor control apparatus as shown in the embodiment 2, when an external event, such as an interruption for example, occurs it is possible to vary both period of 3-phase output and output level of motor control signals, U and UB, or only the output level of the motor control signals, U and UB; thereby, in the case of the motor control apparatus in the embodiment 2 it is made possible to control more kinds of motors than in the case of embodiment 1.

What is claimed is:

1. A motor control apparatus for controlling a polyphase motor comprising: a central processing unit which executes general control over the process of said motor control apparatus, a timer portion which generates a predetermined pulse from a reference clock signal, a plurality of registers which are provided corresponding to control signals of respective phases and in which data are reloadable by the control of said central processing unit, shift registers which are able to store data having the same number of bits as the number of said plurality of registers, and to which the values of said plurality of registers can be reloaded by said predetermined pulse output from said timer portion, and control signal generator means which generate control signals of respective phases of said polyphase motor based on the output signals of said shift registers.

2. A motor control apparatus according to claim 1, wherein said timer portion comprises: a synchronization timer which generates synchronizing pulses, a waveform generator timers which start counting every time when a pulse is output from said synchronization timer and vary the levels of the output signals after the predetermined counting is finished, which starts the action of a shift register, and a first OR circuit which ORs a synchronizing pulse output from said synchronization timer and a write signal of the count value of said synchronization timer and supplies the ORed data to said waveform generator timers and also to said shift registers as a start signal for the action of reloading the data stored in the registers to said shift registers.

3. A motor control apparatus according to claim 2 further comprising a second OR circuit which ORs the output of said first OR circuit and a reload instruction signal output from said central processing unit and supplies the ORed data to said shift registers as a start signal for the action of reloading the data stored in said registers to said shift registers.

* * * * *